Nov. 18, 1930. H. DALTON 1,782,195
BELT TIGHTENING MECHANISM FOR MOTOR DRIVEN SUPPLY UNITS
Original Filed Jan. 16, 1922 2 Sheets-Sheet 1
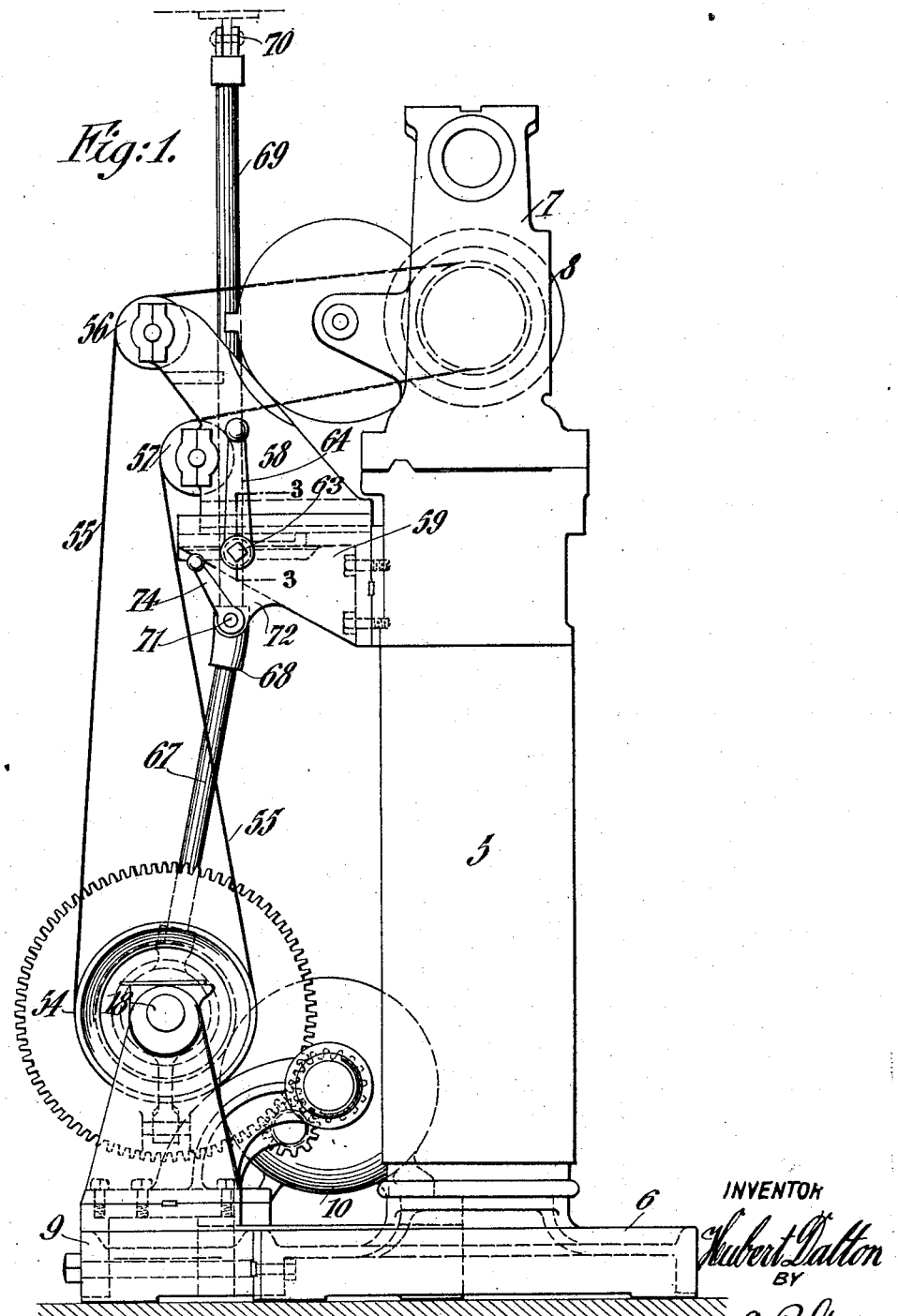
INVENTOR
Hubert Dalton
BY
C. P. Goepel
ATTORNEY.

Nov. 18, 1930. H. DALTON 1,782,195
BELT TIGHTENING MECHANISM FOR MOTOR DRIVEN SUPPLY UNITS
Original Filed Jan. 16, 1922  2 Sheets-Sheet 2
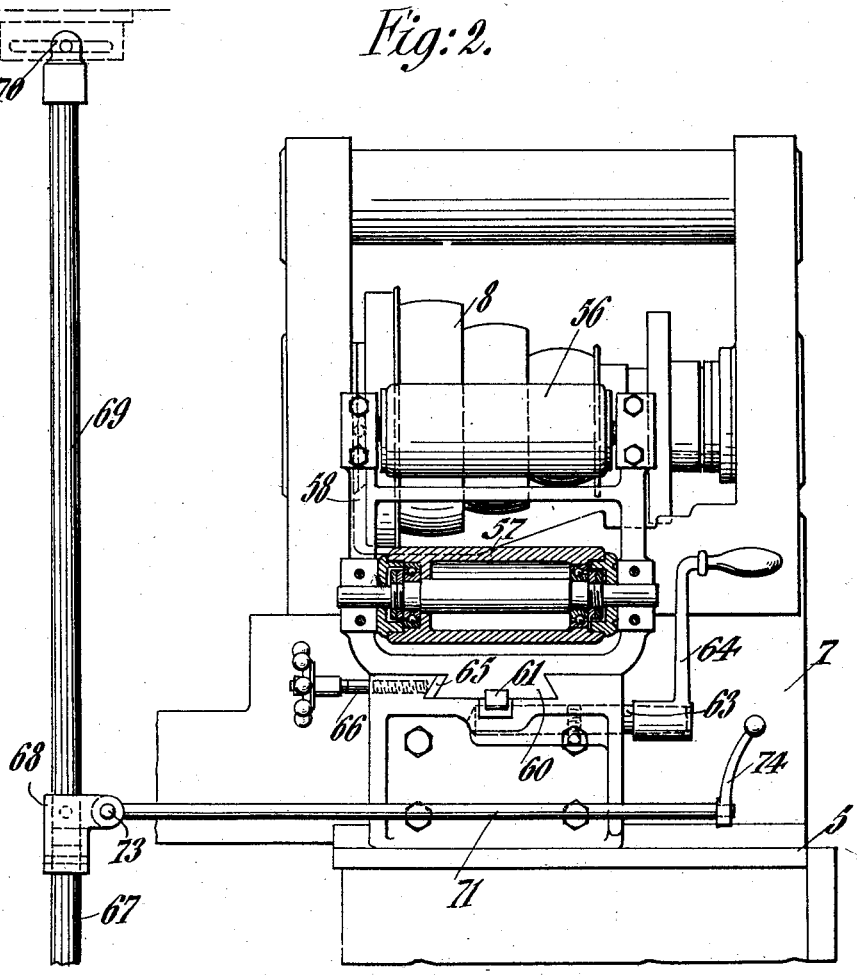
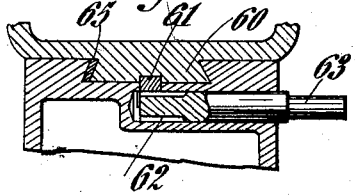
INVENTOR
Hubert Dalton
C. P. Goepel
ATTORNEY.

Patented Nov. 18, 1930

1,782,195

UNITED STATES PATENT OFFICE

HUBERT DALTON, OF STAMFORD, CONNECTICUT

BELT-TIGHTENING MECHANISM FOR MOTOR-DRIVEN SUPPLY UNITS

Original application filed January 16, 1922, Serial No. 529,406. Divided and this application filed January 9, 1925. Serial No. 1,335.

This application is a division of my application Serial No. 529,406, filed January 16, 1922, for motor driven power supply units (Patent Number 1,544,377, June 30, 1925).

This invention relates to an improved motor driven power supply unit for lathes, drilling or milling machines and similar machines which are usually operated in series by power supplied from a common overhead counter-shaft. It is the purpose of my present improvements to provide an individual power supply unit for each one of such a series of machines so that any one machine in the series may be disconnected from the common power supply source and its operation continued by means of the individual motor driven power unit.

To the above end my invention broadly comprehends a mechanism in constant connection with the main operating spindle of the machine and the motor driven shaft together with means operable at will for rendering such mechanism effective to drive the machine spindle in either direction.

An additional feature of novelty consists in the provision of an improved belt tightening means to coact with the stretches of an endless belt connecting the counter-shaft with the machine spindle whereby the proper tension may be maintained upon said belt.

In general, I propose to provide a motor driven power supply unit in the form of an accessory or attachment for various types of metal working machines which consists of comparatively few parts effective and reliable in operation and not liable to get out of order, the attachment being capable of manufacture at relatively small cost.

With the above and other objects in view, the invention consists in the improved motor driven power supply unit and in the form, construction and relative arrangement of its several parts as will be hereinafter more fully described, illustrated in the accompanying drawings and subsequently incorporated in the subjoined claim.

In the drawings wherein I have illustrated one practical and satisfactory embodiment of the invention and in which similar reference characters designate corresponding parts throughout the several views, in which Figure 1 illustrates an end elevation of a preferred form of my present improvements, as applied for use in connection with a metal working machine, Figure 2 illustrates a side elevation of the upper part of the machine, and Figure 3 is a detail section taken on the line 3—3 of Figure 1.

In the accompanying drawings, for the purpose of showing the manner of application and use of the present invention, I have illustrated the same associated with a metal working machine. However, I have shown only so much of the latter as is necessary to a clear understanding of the present improvements. Accordingly, there may be seen in the drawings the hollow column 5 rising from the machine base 6 and supporting a head frame 7. In this head frame the main driving spindle for the machine is journaled at its ends in suitable bearings and has fixed thereon the usual stepped belt pulley 8. The spindle is driven at various speeds by engaging the driving belt extending from an overhead counter-shaft with a selected step of the pulley 8. In large factories, a series of such machines are thus operated from the same counter-shaft, the power for which is usually supplied by a steam-driven engine. Frequently, the driving belts break so that one or more of the machines must be idle until the belt is repaired or a new belt supplied. For various other reasons, as for instance owing to a temporary diminution of the power supply, it may become necessary to disconnect one or more of the machines from the counter-shaft. In order to obviate the loss incident to such temporary idleness of the machines, I propose to provide an auxiliary power source for each machine whereby it may be driven independently of the common power supply means for the series of machines.

As herein shown, a supporting base 9 is provided and suitably attached to the machine base 6. Upon the base 9 a non-reversible electric motor 10 of the required size is mounted, the shaft of which is connected to one end of a power transmitting mechanism fully described in my prior application, of which this application is a division. The counter-shaft 18 of this transmission mechanism is provided with a stepped pulley 54 which is keyed or otherwise rigidly fixed thereto and is connected by means of the driving belt 55 to the stepped pulley 8 on the main operating spindle of the machine. The two stretches of this driving belt are trained over guide rollers 56 and 57 respectively which are rotatably mounted in parallel relation to each other in a supporting frame 58. A bracket 59 is fixed to one side of the machine head 7 and is provided in its upper surface with a groove or channel in which a dove-tail rib 60 on the bottom face of the frame 58 has sliding engagement. This rib is provided with a longitudinally extending rack 61 which is engaged by teeth 62 cut on the inner end of a shaft 63 mounted in the bracket 59. A suitable operating handle 64 may be applied to the other end of this shaft. From reference to Figure 1 of the drawings it will be apparent that upon rotating shaft 63 in the proper direction, the frame 58 carrying the guide rollers 56 and 57 may be moved outwardly to take up slack in the belt 55 and apply the proper tension thereto.

Between one side of the dove-tail rib 60 and the side wall of the channel in the bracket 59 a shim 65 is disposed. A screw 66 threaded in the bracket 59 engages the outer side of the shim and by adjusting this screw it will be readily seen that the frame 58 may be securely fixed and held in its adjusted position upon the bracket 59.

As shown in my original application rotation is transmitted to shaft 18 from motor 10 by suitable gearing and a shiftable clutch is employed whereby the belt pulley 54 can be rotated in either direction. While any suitable means might be used for shifting this clutch, I preferably provide for this purpose a rod 67 connected to the upper end of said lever and coupled at its upper end by means of the sleeve 68 to a second rod 69 which may be movably or slidably connected at its upper end to a bracket or other relatively fixed part as indicated at 70. An axially shiftable rod 71 is movable through a supporting lug 72 on the bracket 59 and is pivotally connected at one of its ends as at 73 to the sleeve 68. A suitable handle 74 is provided upon the other end of said rod. By means of this handle the rod 71 can be longitudinally shifted to actuate the clutch shifting rods 67 and 69 and thereby shift the clutch in the proper direction.

From the foregoing description, the manner of operation and several advantages of the present invention will be readily understood. Thus, in the event that the driving belt from the overhead counter-shaft should break or for any other reason it should become necessary to disconnect the operating spindle of the machine from the overhead power shaft, the operation of the machine may be continued by means of the individual power supply unit.

The important feature of the invention as set forth in this divisional application resides in the means above described for tightening the driving belt 55 whereby equal tension is simultaneously applied to each stretch of the belt.

In the accompanying drawings and the foregoing description, I have disclosed a particular embodiment of the invention which in actual practice has given highly satisfactory results. It will be understood that the motor driven power supply units may be employed as an auxiliary individual power supply means for use in connection with many different kinds of machines which are usually operated in series from a common counter-shaft deriving its power from either a steam, gas or electrically driven engine. Further, it will be apparent that the improved power supply unit is susceptible of many modifications and may be exemplified in various other alternative structures than the example illustrated herein. Accordingly, the privilege is reserved of resorting to all such legitimate changes in the form, proportion and arrangement of the several cooperating parts as may be fairly embodied within the spirit and scope of the invention as claimed.

I claim:—

Belt tightening mechanism including, in combination with a horizontal driven shaft, coned pulleys on said shaft, a supporting standard therefor and a driving shaft, a pulley on said driving shaft, and an endless driving belt engaged with said pulleys; a supporting bracket fixed to and projecting laterally from one side of said standard, a pulley carriage mounted for sliding movement on said bracket, means for adjusting said carriage towards and from the supporting standard, said carriage including a single pair of spaced bearing standards, and a pair of belt guiding pulleys journalled upon and between said standards arranged within their axes in fixed vertically and laterally spaced relation to each other and engaged with the respective stretches of the driving belt whereby said belt stretches are simultaneously and equally tensioned in the adjustment of said carriage.

In testimony that I claim the foregoing as my invention, I have signed my name hereto.

HUBERT DALTON.